March 29, 1955 O. O. FIET 2,705,304
BRIDGE DEMODULATOR CIRCUIT
Original Filed Feb. 1, 1952 2 Sheets-Sheet 1

INVENTOR
Owen O. Fiet
BY
Charles H. Brown
ATTORNEY

March 29, 1955 O. O. FIET 2,705,304

BRIDGE DEMODULATOR CIRCUIT

Original Filed Feb. 1, 1952

2 Sheets-Sheet 2

INVENTOR
Owen O. Fiet
BY
Charles H. Brown
ATTORNEY

United States Patent Office 2,705,304

Patented Mar. 29, 1955

2,705,304

BRIDGE DEMODULATOR CIRCUIT

Owen O. Fiet, Oaklyn, N. J., assignor to Radio Corporation of America, a corporation of Delaware Continuation of abandoned application Serial No. 269,541. This application April 19, 1954, Serial No. 424,033

10 Claims. (Cl. 332—47)

This invention pertains to an improved demodulating system and more particularly to a monitor system wherein double heterodyning is employed utilizing two bridge-type or balanced mixer circuits.

This application is a continuation of copending application Ser. No. 269,541, filed on February 1, 1952, now abandoned.

In transmitting television signals from a broadcast transmitter, it is desirable to have a demodulator capable of producing a very high quality video signal representative of all of the picture energy radiated by the antenna system of the broadcast transmitter. For monitoring purposes, the video information impressed on the carrier wave should not be distorted by the demodulating equipment. For this reason ordinary television receivers suitable for home use are not desirable as station monitors because of the possibility of local oscillator drift, impaired video passband characteristics, and perhaps a variable attenuation of the different frequencies contained in the video channel to which they are tuned.

The present invention provides a high fidelity demodulation system which is extremely stable in operation and which produces an intermediate frequency signal containing a true representation of the information of the transmitted carrier wave. The demodulator system of the invention will be described particularly with respect to a monitoring system for use with broadband very high and ultra-high frequency signals suitable for television picture transmission; but in its broadest aspects, the demodulator is utilizable for other types of signal modulation systems.

Among the objects of the present invention are: to provide a novel double heterodyne demodulator for producing an extremely stable intermediate freequency wave containing a faithful representation of the modulation of the carrier wave; to provide a novel monitoring system for use at the transmitting location which faithfully reproduces the intelligence signal information impressed on the transmitted carrier wave: to provide a novel bridge-type mixer arrangement; and to provide an improved structural arrangement of a bridge mixer suitable for use at ultra-high frequencies.

In accordance with the present invention, there is provided a demodulation system which employs a first mixer circuit to combine a sample of unmodulated carrier frequency with a stable offset frequency oscillator. The output of this first mixer may then be filtered to remove unwanted frequency components. A second mixer circuit is of the balanced bridge type and combines a sample of the modulated carrier containing the information to be transmitted with the filtered output of the first mixer. The output of the second mixer contains only the offset frequency plus the modulation information, and may be detected and displayed in a conventional manner.

A feature of the invention resides in the structural arrangement of the bridge-type ultra-high frequency mixer circuits which utilize coaxial lines. The coaxial lines forming part of the bridge-type mixers properly terminate the system with respect to each of the several signal sources to minimize reflections and at the same time compensate for the introduction of reactance from other circuit elements.

A more detailed description of the invention follows in conjunction with a drawing wherein.

Figure 1:
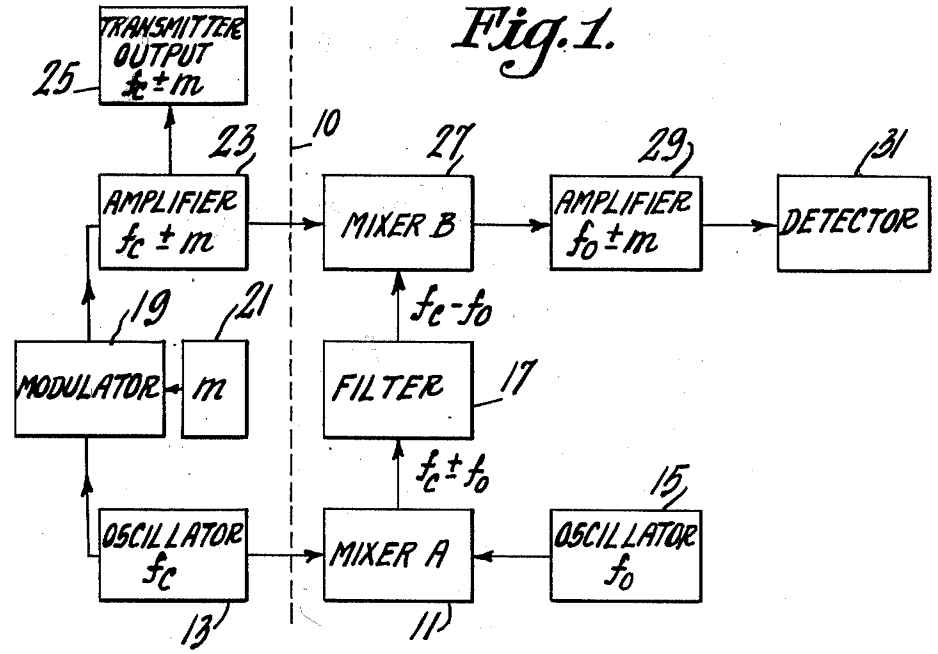
Figure 1 is a block diagram of the demodulation system of the invention.

Referring to Figure 1, there is shown a block diagram illustrating the operation of the demodulation system of the invention utilizing double heterodyning by means of two bridge-type mixer circuits. That portion of the diagram to the left of the vertical dash line 10 represents a conventional transmitter, while that portion to the right of the line 10 represents the demodulator or monitoring system of the invention. A first mixer A shown by box 11, which may be a balanced bridge-type mixer, is fed with a sample of a stable unmodulated carrier, for example from the carrier frequency oscillator 13 of a radio or television transmitter. Mixer A is also fed from a separate controlled source of oscillations 15 of an offset frequency $f_o$, which may be a desired output intermediate frequency upon which the modulation of the transmitter is to be impressed for monitoring purposes. The output of the bridge-type mixer A consists of both sidebands, $f_o \pm f_o$. The carrier frequency $f_c$ as well as the offset frequency $f_o$ is suppressed in the output of the bridge-type mixer A. The output of mixer A is then passed thru a filter 17 to substantially eliminate the offset carrier $f_o$ and an undesired sideband, for example $f_c + f_o$. This leaves at the output of the filter 17 substantially only a single frequency component, for example $f_c - f_o$.

The first mixer A need not be either a balanced or a bridge-type mixer. An ordinary single-sided heterodyne mixer may be employed in the first mixing action. A bridge-type or balanced mixer is preferable for many applications since one or both of the frequencies which are fed to such a mixer are suppressed in the output of the mixer. Unless a balanced mixer or bridge-type mixer is used, additional filtering may be necessary in the filter 17 to eliminate all of the undesired mixer products.

From the same carrier frequency oscillator 13 from which one input to the mixer A was derived, energy is taken, amplified and applied to a modulator circuit 19 where it is modulated by intelligence signal energy $m$ from a source 21, which may be, for example, voice, telegraph, picture, or similar signal information. The output of the modulator 19 depends upon the type of modulation employed and may be, for example, single sideband with carrier suppression, both sidebands with carrier suppression, both sidebands with carrier, or carrier plus one sideband in its entirety and only part of the other sideband. The last type of modulation, carrier plus one sideband complete and only part of the other sideband, is termed vestigial sideband modulation and is presently employed in television picture transmission.

The output of the modulator 19 may be amplified by a conventional amplifier stage 23 to bring it to the proper level for transmission to the utilization circuit, such as a transmission line or a broadcast antenna or the like. The amplifier stage 23 is unnecessary in the type of transmitter in which the final output stage is modulated. With either system, the modulated carrier $f_c \pm m$ is coupled from a final modulated amplifier or an amplifier stage 23 to an output circuit 25. such as an antenna or transmission line.

A bridge-type second mixer 27 designated as mixer B serves to combine the desired output of mixer A with a sample of the modulated carrier from the amplifier stage 23. By utilizing a bridge-type or balanced mixer B to combine the two signals, the carrier frequency $f_c$ is balanced out and the filtered mixer product of mixer A, for example, $f_c - f_o$, is suppressed. The output of the mixer B then contains the desired offset carrier frequency $f_o$ and the modulation products originally impressed on the carrier wave ($f_c \pm m$), but now impressed on the offset frequency wave, that is $f_o \pm m$.

The output of the mixer B is then fed to an offset frequency amplifier 29 which may be, for example, a broad tuned amplifier such as an intermediate frequency amplifier. For television picture demodulation, the offset frequency amplifier 29 is preferably tuned to one of the standard intermediate frequencies for television reception, for example 30 megacycles. As has been mentioned, the offset oscillator 15 produces oscillations of the same intermediate frequency, in this case 30 megacycles.

When the demodulator of the present invention is utilized for television picture demodulation, provision must be made to suppress any coupling from the output of the offset frequency oscillator 15 into the offset frequency amplifier 29. This is necessary because any amount of the offset frequency wave would be amplified in the offset frequency amplifier 29 and demodulated as a direct current component. The presence of even a small amount of stray energy having a frequency which represents the direct current component ($f_o$) at the offset frequency renders the demodulator practically useless for monitoring purposes. With an unknown amount of such energy, the monitoring apparatus will not accurately measure the percentage modulation of the carrier wave and can not be relied upon to give a true indication of the direct current component or the various synchronizing and blanking levels which must be maintained within extremely rigid tolerance.

One method of suppressing the coupling from the output of the offset frequency oscillator 15 is to connect that oscillator across the bridge-type mixer A in such a way that the offset frequency $f_o$ is suppressed in the output of the mixer A. Another arrangement is to utilize circuit elements in the filter 17 which effectively short-circuit and effect an extremely high loss to energy at the offset frequency $f_o$.

After being amplified in the offset frequency amplifier 29, the modulated offset frequency signals $f_o \pm m$ are supplied to a conventional detector 31 where they are treated in the usual manner and may be displayed in the case of a visual signal, or converted to either an aural or visual signal in case of sound information, for monitoring purposes.

When the demodulation system explained in connection with Figure 1 is employed, it will be seen that the output of mixer B will contain no distortion due to frequency drift or shift of the carrier frequency oscillator 13. By combining a sample from the carrier frequency oscillator 13 with the offset frequency oscillator 15, the output of mixer A will change in frequency by the same amount as the sample of modulated carrier, $f_c \pm m$, which is supplied to mixer B. When the two signals, one from mixer A and the sample from the amplifier stage 23 are applied to the mixer B, no distortion or alteration of the passband is present at the input of the offset frequency amplifier 29. The only critical oscillator, as far as the bandpass characteristics of the offset or intermediate frequency amplifier 29 are concerned, is the offset frequency oscillator 15. This offset frequency oscillator 15 operates at a lower frequency than a local oscillator in a conventional super-heterodyne demodulation system and therefore can be made much more stable, for example, by being crystal controlled, to insure that the band of frequencies to be detected will be properly placed in the passband of the offset or intermediate frequency amplifier 29.

Figure 2:
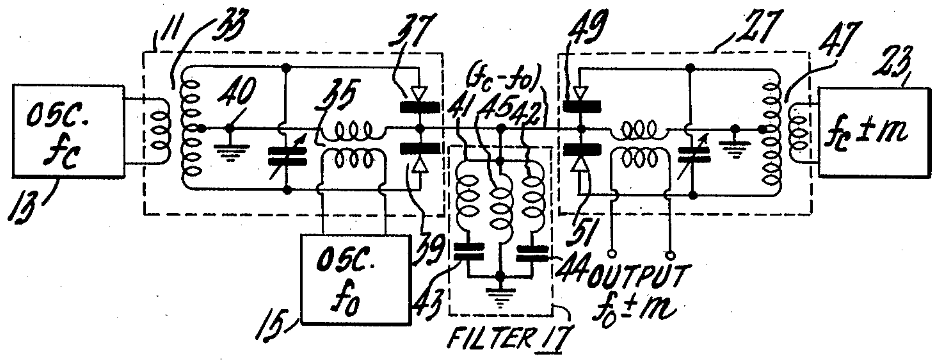
Figure 2 is an electrical circuit diagram of the invention arranged for operation in the very high frequency range.

Referring now to Figure 2, there is shown a circuit diagram of the demodulation system of Figure 2 adapted for operation in the very high frequency range. A bridge-type crystal mixer is shown within the dotted line box 11 and corresponds to mixer A of Figure 1. The bridge-type crystal mixer 11 is supplied with a sample of the transmitter carrier frequency from the carrier frequency oscillator 13 in push-pull by means of a carrier input transformer 33 which is center-tapped to form two arms of a bridge. The output from the offset frequency oscillator 15 is coupled across a diagonal of the bridge-type crystal mixer 11 by means of an offset carrier input transformer 35. Two nonlinear conducting devices 37, 39 comprise the remaining two arms of the bridge and will be described hereafter as crystal rectifiers, although it is to be understood that other nonlinear devices, such as diodes, triodes, and multigrid tubes, as well as dry rectifiers such as copper oxide and selenium, may also be employed. The output of the bridge-type crystal mixer 11 is taken between the junction of the crystal rectifiers 37, 39 and a point of potential reference 40 such as ground. Due to the bridge-type mixer arrangement, energy from the source which is connected across the two arms of the bridge formed by the input transformer 33 does not appear in an output which is taken across the diagonal of the bridge. The sum and difference frequencies of the two sources are full-wave rectified and appear as the main output across the diagonal of the bridge between the junction of the crystal rectifiers 37, 39 and the point of potential reference 40.

The output of the first bridge-type crystal mixer 11 containing the sum and difference components of the carrier frequency oscillator 13 and the offset frequency oscillator 15 ($f_c \pm f_o$) may then be filtered to remove undesired frequency components. A filter 17 is shown which is designed to have one arm series resonant by tuning an inductance 41 and a capacitor 43 to an undesired frequency component, for example $f_c + f_o$, or to both $f_c$ and $f_c + f_o$. To give the required attenuation to the offset frequency $f_o$, another arm composed of an inductance 42 and a capacitor 44 may be added and series tuned to the offset frequency $f_o$. The entire filter 17 may then be made parallel resonant to the desired frequency component, for example $f_c - f_o$ by adding a third arm 45 which has the proper reactance at the desired frequency. The total reactance of the two series-tuned arms, one composed of the inductance 41 and the capacitor 43 and the other composed of the inductance 42 and the capacitor 44, may be either capacitive or inductive at the lower frequency product $f_c - f_o$. If this total reactance is capacitive, an inductive reactance is inserted as the third arm 45 to make the entire filter 17 parallel resonant at the desired frequency $f_c - f_o$. Similarly, if the total reactance of the two arms is inductive at the desired frequency $f_c - f_o$, a capacitive reactance would be inserted in the place of the inductive reactance shown as the third arm 45 to make the entire filter 17 parallel resonant at the desired frequency.

Depending upon the range of frequencies employed and the ratio of difference in frequency between the carrier frequency $f_c$ and the offset frequency $f_o$, it may be necessary to couple the offset frequency oscillator 15 across the two arms of the bridge and apply the signal from the carrier frequency oscillator 13 across the diagonal of the bridge. This will result in a better suppression of the offset frequency signal, which, as mentioned above, is necessary when percentage modulation of the carrier wave and the various synchronizing and blanking levels of a television picture signal are to be accurately measured. Theoretically, with the bridge type of mixer circuit, energy which is coupled across the arms of the bridge is completely suppressed in an output taken across a diagonal. Actually, however, such perfect balance is difficult to attain. It becomes desirable therefore that the filter 17 be designed to have additional rejection by means of a series resonant arm to the energy which is coupled across the center-tapped input transformer 33.

A second bridge-type crystal mixer 27 is supplied with a sample of the modulated carrier frequency from the final amplifier 23 of the transmitter across a center-tapped winding of a signal input transformer 47 which forms two arms of a bridge. The remaining two arms of the bridge are composed of two nonlinear conducting devices 49, 51 similar to those described above in connection with the bridge-type crystal mixer 11, and will be referred to hereafter as crystal rectifiers. The output of mixer 11, after being filtered, for undesired components in the filter 17, is therefore impressed between the junction of the crystal rectifiers 49, 51 and the point of reference potential 40. The main output across the diagonal of the bridge is the difference between the filtered output of the first mixer 11 and the sample of modulated carrier $f_c \pm m$ from the amplifier stage 23. This output $f_o \pm m$ comprises the modulation $m$ originally present on the carrier wave, that is, $f_c \pm m$, but now imposed on the offset frequency wave.

Figures 3, 4, 5:
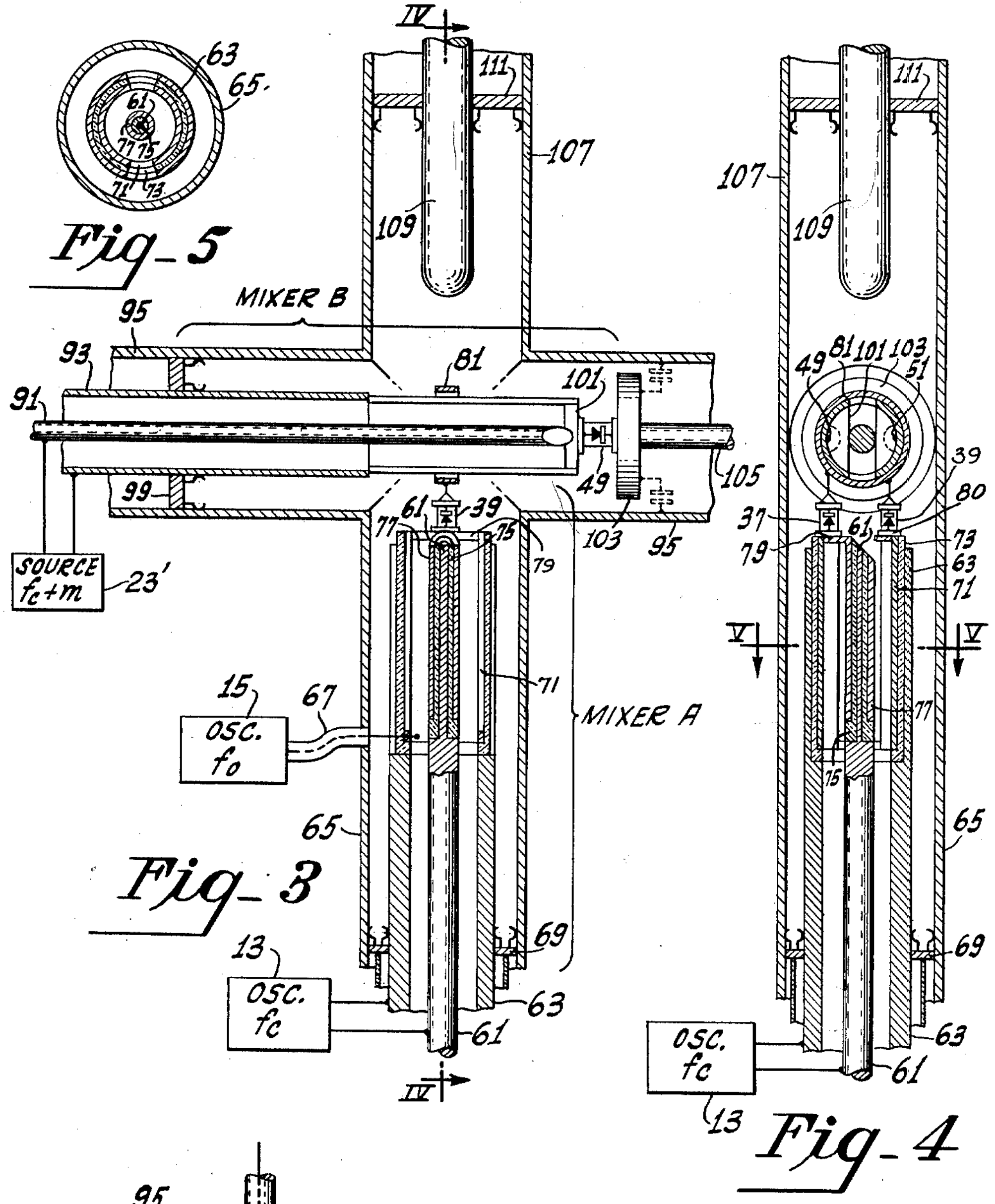
Figure 3 is a cross-sectional view of the demodulator of the invention employing coaxial lines for use at ultra-high frequencies.
Figure 4 is a cross section in elevation of the same demodulator taken along the line IV of Figure 3.
Figure 5 is a cross section of one portion of one of the mixer circuits taken along the line V of Figure 4.

Referring now to Figures 3 and 4, Figure 3 shows a cross-section in elevation and Figure 4 is a cross-section end view of the double mixer demodulator of the present invention employing coaxial lines for use at ultra-high frequencies. In this embodiment, a first bridge-type mixer includes a coaxial arrangement having an inner conductor 61, an intermediate cylindrical wall 63, and an outer cylindrical wall 65. A source of carrier frequency such as a carrier frequency oscillator 13 is coupled between the inner conductor 61 and the intermediate cylindrical wall 63. The inner conductor 61 and the intermediate cylindrical wall 63 constitute a coaxial transmission line and is preferably proportioned to match the impedance at the output of the carrier frequency oscillator 13.

The outer cylindrical wall 65 is short-circuited by an annular shorting bar 69 to the intermediate cylindrical wall 63 at a point removed from the end of the intermediate cylindrical wall 63. The end of the intermediate cylindrical wall 63 farthest removed from the annular shorting bar 69 is bifurcated for a distance of approximately one-quarter wavelength at the carrier frequency $f_c$ to provide two parallel conductors. The arrangement of the bifurcated end of the intermediate cylindrical wall 63 is illustrated further in connection with Figure 5 and will be additionally described below in connection with that figure. The bifurcated portion of the intermediate cylindrical wall 63 is capacitively coupled to a similarly bifurcated sleeve 71 which fits within the bifurcated end portion of the intermediate cylindrical wall 63. The bifurcated sleeve 71 is spaced from the intermediate cylindrical wall 63 by a cylindrical sleeve of insulation 73.

A source of offset frequency $f_o$, for example from the offset frequency oscillator 15, is coupled between the outer cylindrical wall 65 and the bifurcated sleeve 71. When the source of offset frequency 15 is remotely located with respect to the mixer, a coaxial cable 67 may be utilized. Such a coaxial cable 67 would have its outer conductor directly connected to the outer cylindrical wall 65 and its inner conductor directly connected to the bifurcated sleeve 71. It is desirable in many applications of the present invention to locate the offset frequency oscillator 15 directly on the outer cylindrical wall 65 and provide good shielding to prevent energy from the offset frequency oscillator from being coupled thru stray fields outside of the mixer structure to other portions of the demodulator circuit, such as for example the offset frequency amplifier shown in Figure 1. With this arrangement, the output of the offset frequency oscillator 15 would be single-sided with respect to the outer cylindrical wall 65, and an inner conductor corresponding to the inner conductor of the coaxial cable 67 would extend thru an aperture in the outer cylindrical wall 65, an aperture in the intermediate cylindrical wall 63 and the cylindrical insulating sleeve 73 and be directly connected to the bifurcated sleeve 71.

The inner conductor 61 has its end coupled at radio frequencies to one side of the bifurcated sleeve 71. As shown in Figures 3 and 4 of the drawing, this radio frequency connection may be made thru a capacitive coupling which is composed of a tubular sleeve 75 of insulation and a conductive tube 77 surrounding the tubular insulating sleeve 75 and the end portion of the inner conductor 61. The conductive tube 77 is electrically connected to one side of the bifurcated sleeve 71 by a block of conductive material 79. The block of conducting material 79 may be shaped as a semicircle to fit into one side of the bifurcated sleeve 71 and the other side made straight to make contact with the conductive tube 77. At frequencies above 300 megacycles it will be found that introducing such a block of conductive material on one side of a bifurcated sleeve line will create a slight unbalance and reflection. For this reason it is desirable to include a similar semicircular block 80 at the end portion of the other part of the bifurcated sleeve 71. Of course, the second similar semicircular block 80 will not be electrically connected or coupled to the inner conductor 61. The arrangement of this portion of the circuit can best be visualized from an inspection of Figure 4.

Mechanically secured to and electrically connected to each of the two ends of the bifurcated sleeve 71 is a pair of unilateral conducting devices 37 and 39 like those described in connection with Figure 2. Due to their small size and excellent electrical characteristics, crystal diode rectifiers are preferred in the structure of this invention, although other types of nonlinear conductive devices may be utilized. Both crystal rectifiers 37 and 39 are shown as poled to be conductive toward a metallic ring 81 and are electrically connected and mechanically secured thereto. The operation of the present invention would not be altered if both crystal rectifiers 37 and 39 were reversed to be conductive away from the metallic ring 81 and toward the two ends of the bifurcated sleeve 71. Also, if one of the two crystal rectifiers 37 or 39 is reversed, mixing action still takes place and all of the desired mixer frequencies ($f_c \pm f_o$) are obtained, but in addition the bridge circuit is symmetrical both with respect to the source coupled across the inner conductor 61 and the intermediate cylindrical wall 63, and to the source coupled in push-push between the intermediate cylindrical wall 63 and the outer cylindrical wall 65. This latter arrangement is preferable where sufficient filtering is difficult to obtain.

A bridge-type second mixer is also provided to combine the output of the bridge-type first mixer just described with a sample of the modulated carrier from a source 23' which may be a final amplifier like the amplifier stage 23 described above in connection with Figures 1 or 2. The sample of modulated carrier may also be derived from the transmission line to the utilization device, for example, the transmission line between the transmitter amplifier and an antenna in the usual broadcast station installation. For very high and ultra-high frequency applications, especially where television picture transmission is being monitored, it is preferable to sample the modulated carrier $f_c \pm m$ in the transmission line between the transmitter output and the antenna. A directional coupler may be employed for this purpose. Such directional couplers are sensitive to energy flowing in only one direction in the transmission line and give an accurate sample of the energy flowing toward the antenna and radiated thereby. Such a directional coupler which may be used as the source 23' in this invention is disclosed and claimed in my copending application Serial No. 269,542, filed on February 1, 1952, and assigned to the same assignee as this application.

The bridge-type second mixer also includes a coaxial arrangement having an inner conductor 91, an intermediate cylindrical wall 93 and an outer cylindrical wall 95. The source of modulated carrier 23' is coupled between the inner conductor 91 and the intermediate cylindrical wall 93. As in the first mixer, the inner conductor 91 and the intermediate cylindrical wall 93 constitute a coaxial transmission line proportioned to match the impedance of the source of modulated carrier frequency 23'.

The output of the first mixer is coupled between the outer cylindrical wall 95 and the intermediate cylindrical wall 93 by means of the joint between the two outer cylindrical walls 65 and 95 of the mixers and the metallic ring 81 which is mechanically secured to and makes electrical contact with the intermediate cylindrical wall 93 of the second mixer.

In the second mixer, the outer cylindrical wall 95 is short-circuited by an annular metallic shorting bar 99 to the intermediate cylindrical wall 93 at a point removed from the metallic ring 81. The end of the intermediate cylindrical wall 93 farthest removed from the annular shorting bar 99 is bifurcated for a distance of approximately one-quarter wavelength at the carrier frequency $f_c$ to provide two parallel conductors. The arrangement of the bifurcated end of the intermediate cylindrical wall 93 of the second mixer is illustrated in greater detail in Figure 6 and will be additionally described below.

The inner conductor 91 of the second mixer is connected to one side of the bifurcated end of the intermediate cylindrical wall 93. This connection is made thru a semicircular block 101 similar to the semicircular block 79 described above in connection with the first mixer. A second semicircular block 102 is provided which fits into and makes contact with the other side of the bifurcated end of the intermediate cylindrical wall 93. As explained above in connection with the first mixer A, this second semicircular block 102 is not connected to the inner conductor 91 of the second mixer, but is provided only for balancing the bifurcated line portion of the intermediate cylindrical wall 93.

Mechanically secured to and electrically connected to each side of the bifurcated end of the intermediate cylindrical wall 93 of the second mixer are identical crystal rectifiers 49, 51. Each of these rectifiers is poled toward and is electrically connected to a metallic disc 103 which is in capacitive relation to the outer cylindrical wall 95 of the second mixer by virtue of its close spacing to the wall 95. Either or both of the rectifiers 49, 51 may be reversed in polarity in the second mixer also as explained above in connection with the first mixer.

The metallic disc 103 is electrically connected to a cylindrical inner conductor 105 which together with a continuation of the outer cylindrical wall 95 of the second mixer forms a coaxial output line. The output of the second mixer thus appears between the cylindrical inner conductor 105 and the outer cylindrical wall 95 single-sided with respect to the outer cylindrical wall as a point of potential reference.

A coaxial trap portion having an outer conductor 107, an inner conductor 109 and an adjustable shorting metallic block 111 is used to accomplish part of the filter action like the filter 17 of Figures 1 or 2. For maximum Q, and therefore for maximum loss in the coaxial trap, the diameter ratio of outer to inner conductors should be 3.59 to 3.6.

The coaxial trap is adjusted by setting its length to have its greatest loss at one frequency which it is desired to eliminate. The reactance of the trap section, including the outer conductor 107, the inner conductor 109, and the shorting block 111, is tuned out at the desired output frequency by adjustment of the annular shorting bar 99 in the second mixer B. The annular shorting bar 69 of the first mixer may be utilized in conjunction with the coaxial trap to form another circuit for attenuating a different undesired frequency.

In Figure 5, which is a cross section of one portion of the mixer A taken along a line V of Figure 4, the relation of the outer cylindrical wall 65, the intermediate cylindrical wall 63, and the inner conductor 61 can readily be seen. The bifurcated portion of the intermediate cylindrical wall 63 is shown as having a cylindrical sleeve of insulation 73 separating each side of the bifurcated portion of the intermediate cylindrical wall 63 from the bifurcated sleeve 71. The inner conductor 61 in this cross-sectional portion is shown surrounded by the tubular insulating sleeve 75 which is itself surrounded by the conductive tube 77. While the length of the slot in each side of the bifurcated sleeve 71 and intermediate cylindrical wall 63 is directly related to the operating wavelength, the width of the slot is effected by bandwidth considerations. Generally, the rule is that the wider the slot the greater percentage bandwidth in each case.

Figure 6:
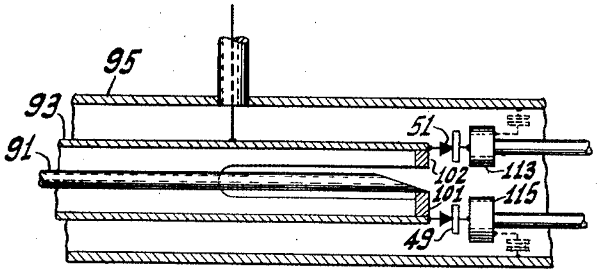
Figure 6 is a schematic representation of one portion of an alternative arrangement of one of the mixers shown in Figure 3.

Referring to Figure 6, there is shown an alternative arrangement of one portion of one of the mixers shown in Figures 3 and 4. In order to obtain a push-pull output from, for example, mixer B of Figure 3 or 4, the single metallic disc 103 of Figures 3 and 4 is replaced with two separate discs or semicircular shaped blocks 113 and 115. Each of these discs 113 and 115 is balanced capacitively with respect to the outer conductor 95 which forms a shield for the balanced output line. The two conductors 117, 119 form a balanced output line, are identical, and are proportioned in diameter and spacing from each other and from the outer conductor 95 to have the proper characteristic impedance to match the amplifier or detector with which the mixer output is coupled.

In Figure 6, also the structure of the connection between the inner conductor 91 and the bifurcated portion of the intermediate conductor 93 can more easily be seen. It will be noticed that in the vicinity of the semicircular closing block 101, the inner conductor 91 is cut off on a diagonal so that proper clearance is obtained between the inner conductor 91 and the other semicircular closing block 102.

In the operation of the demodulator of this invention utilizing the coaxial line crystal mixers at ultra-high frequencies, the first mixer A is utilized to combine the source of carrier frequency with a highly stable source of offset frequency oscillations. In the arrangement shown in Figures 3 and 4, a convenient method of operation is as follows: The source of carrier frequency $f_c$ is coupled across the inner conductor 61 and the intermediate cylindrical wall 63. The length of the bifurcated portion of the intermediate cylindrical wall 63 is approximately one-quarter wavelength at the carrier frequency, but due to the capacitive loading near the end of the bifurcated slot portion, this bifurcated section will be shorter than one-quarter wavelength for a free space wave. The source of offset frequency 15 is coupled between the bifurcated sleeve 71 and the outer cylindrical wall 65.

The differences in frequency between the source of carrier frequency oscillator 13 and the offset frequency oscillator 15 may be considerable. For example, for certain applications, the carrier frequency oscillator may operate at 850 megacycles and the offset frequency oscillator 15 may operate as mentioned above at 30 megacycles. Due to this large frequency ratio, certain portions of the circuit which have appreciable electrical length at 850 megacycles have negligible electrical length at 30 megacycles. Likewise, certain circuit elements which appear as short circuits for one frequency will appear as extremely high impedances or open circuits for the other frequency. Take, for example, the capacitance formed between the bifurcated portion of the intermediate cylindrical wall 63 and the bifurcated sleeve 71. To the 850 megacycle source 13 this capacitance is practically a short circuit, but from the viewpoint of the offset carrier oscillator 15 operating at 30 megacycles, considerable impedance is presented.

Due to the quarter-wavelength slot in the intermediate cylindrical wall 63 and the bifurcated sleeve 71, and the connection of one side of the slot to the inner conductor 61, the carrier frequency voltage $f_c$ appears across the crystal rectifiers 37, 39 of the mixer A in phase opposition or push-pull relationship. The voltage from the offset frequency oscillator 15 which is coupled between the bifurcated sleeve and the outer wall structure appears across the crystal rectifiers 37, 39 in push-push relationship. From an inspection of the circuit of Figure 2, it can be seen that the operation of Figure 3 is similar to that of Figure 2 except that lumped circuit elements are not employed.

The trap portion composed of the outer conductor 107, the inner conductor 109 and the shorting block 111 opposite the first mixer A is tuned to resonance at the carrier frequency, in this case 850 megacycles. The annular shorting bar 99 of the second mixer B is tuned in conjunction with the trap 107, 109, 111 to pass the desired sideband, in this case the lower sideband of 820 megacycles. The annular shorting bar 69 of the first mixer A may be adjusted to reduce other undesired frequencies.

The modulated carrier is coupled into mixer B across the inner conductor 91 and the intermediate cylindrical wall 93. The length of the slotted portion of the intermediate cylindrical wall 63 beyond the metallic ring 81 to the two semicircular blocks 101, 103 is tuned to be effective one-quarter wave at the carrier frequency.

As mentioned in connection with mixer A above, due to the electrical length of the slotted portion of the intermediate cylindrical wall 93 and the connection of the inner conductor 91 to one side of the bifurcated portion of the intermediate cylindrical wall 63, the modulated carrier wave $f_c \pm m$ appears across the crystal rectifiers 49, 51 in push-pull relationship. The output voltage from the first mixer A, however, appears between the crystal rectifiers 49, 51 in push-push relationship.

The second mixer B, according to this example, combines the desired lower sideband frequency output of the first mixer A with the modulated carrier which has been sampled from the transmitter. Assuming vestigial sideband picture modulation to be present on the transmitted carrier wave, a band of frequencies from 848.5 megacycles to 854.5 megacycles will be present and impressed in push-pull across the crystal rectifiers 49, 51. The lower sideband frequency of 820 megacycles is impressed in push-push, that is, in equal voltage relation in phase across the crystal rectifiers 49, 51. The mixer products of the second mixer B, after being rectified, which appear between the metallic disc 103 and the outer cylindrical wall 95 are as follows: $f_o+m$, in this example 28.5 megacycles to 34.5 megacycles; $f_c-f_o$, in this example 820 megacycles; $f_c \pm m$, in this example 848.5 to 854.5 megacycles; and certain even higher frequency components such as $2f_c-f_o$, etc. The capacitive coupling between the metallic disc 103 and the outer cylindrical wall 95 serves as an ultra-high frequency bypass for the rectified components of frequencies vary far above the offset frequency $f_o$. For frequencies in the range above the lowest undesired frequency likely to be impressed between the metallic disc 93 and the outer cylindrical wall 95, that is $f_c-f_o$ and upward, this capacitive coupling is in effect a short circuit. In the range of frequencies desired as an output from mixer B, that is $f_o \pm m$, the capacitance between the metallic disc 103 and the outer cylindrical wall 95 offers appreciable impedance.

The arrangement of the present invention offers a method of demodulating ultra-high frequency signals which has numerous advantages over conventional systems for monitoring purposes. The use of a balanced or bridge-type mixer as the second mixer B will prevent spurious frequencies generated by the monitoring equipment from being introduced into the output of the transmitter. The introduction of such spurious frequencies into the transmitter can result in unauthorized radiation by the transmitting antenna of undesirable amounts of spurious frequency signals.

Another advantage lies in the frequency stability of the present invention. Where a local oscillator of a conventional system is used to beat directly against the transmitted carrier wave to produce an intermediate frequency wave containing the modulation information, the instability of the local oscillator in such an arrangement produces distortion in the demodulated wave out of all proportion to the percentage of instability. Consider, for example, the case where an 850 megacycle signal is being transmitted and the local oscillator is operating at a frequency of 820 megacycles to give a 30 megacycle intermediate frequency wave. When the local oscillator changes in frequency by 1%, the intermediate frequency wave changes in frequency by 27.3%. An ultra-high frequency oscillator to beat directly with the transmitted ultra-high frequency wave which would offer the same degree of stability in the offset or intermediate frequency wave must therefore be 27.3 times as accurate as the offset oscillator in the system of the present invention. In the ultra-high frequency television band from 470 to 890 megacycles, such a directly beating oscillator must be from 15 to 29 times as accurate in frequency as the offset frequency oscillator of the present invention in order to provide the same faithfulness of reproduction of the modulation information on the transmitted carrier wave. The system of the present invention, by means of its double heterodyning feature, overcomes the foregoing difficulty of the conventional systems.

What is claimed is:

1. A demodulation system for signal modulation imposed on a carrier frequency wave comprising: a first mixer circuit including an inner conductor, an intermediate conductor surrounding said inner conductor, an outer conductor surrounding said intermediate conductor, said intermediate conductor being slotted for a distance of approximately one-quarter wavelength at the carrier frequency $f_c$ to form a bifurcated end, a radio frequency connection from said inner conductor to one side of said bifurcated end of said intermediate conductor, means coupling unmodulated carrier frequency energy $f_c$ across said inner and intermediate conductors, a source of offset frequency oscillations $f_o$, means coupling said source of offset frequency $f_o$ between said outer conductor and said intermediate conductor, and two rectifiers respectively connected to different sides of said bifurcated end of said intermediate conductor; a second mixer circuit including an inner conductor, an intermediate conductor surrounding said inner conductor, an outer conductor surrounding both said inner conductor and said intermediate conductor, said intermediate conductor being slotted for a distance of approximately one-quarter wavelength at the carrier frequency $f_c$ to form a bifurcated end, a connection from said inner conductor to one side of said bifurcated end of said intermediate conductor, means coupling said signal modulated carrier frequency wave $f_c \pm m$ across said inner and intermediate conductors, a connection from each of said two rectifiers of said first mixer to said intermediate conductor of said second mixer, two additional rectifiers being respectively connected to different sides of said bifurcated end of said intermediate conductor of said second mixer; an output transmission line having an outer conductor electrically connected to said outer conductor of said second mixer and having an inner conductor electrically connected to both of said additional rectifiers of said second mixer; and a coaxial filter associated with said first mixer tuned to reject energy having a frequency of the sum of said carrier frequency and said offset frequency $f_c \pm f_o$.

2. A demodulation system for signal modulation $m$ imposed on a carrier frequency wave $f_c$ comprising a first mixer circuit, a source of offset frequency oscillations $f_o$, means coupling said source $f_o$ to said first mixer, second means coupling unmodulated carrier frequency energy $f_c$ to said first mixer; a coaxial filter associated with said first mixer tuned to reject undesired frequency mixer products; a bridge-type second mixer circuit including an inner conductor, an intermediate conductor surrounding said inner conductor, an outer conductor surrounding said intermediate conductor, said intermediate conductor being slotted at one end for a distance of approximately one-quarter wavelength at the carrier frequency $f_c$ to form a bifurcated end, a connection from said inner conductor to one side of said bifurcated end of said intermediate conductor, means coupling said signal modulated carrier frequency wave $f_c \pm m$ across said inner end and intermediate conductors, a connection from the output of said first mixer to said intermediate conductor of said second mixer, two rectifiers respectively connected to different sides of said bifurcated ends of said intermediate conductor of said second mixer; and an output transmission line having an outer conductor electrically connected to said outer conductor of said second mixer and having an inner conductor electrically connected to both of said rectifiers of said second mixer.

3. A demodulation system for signal modulation $m$ imposed on a carrier frequency wave $f_c$ comprising a first mixer circuit, a source of offset frequency oscillations $f_o$, means coupling said source $f_o$ to said first mixer, second means coupling unmodulated carrier frequency energy $f_c$ to said first mixer; a coaxial filter associated with said first mixer tuned to reject undesired frequency mixer products; a bridge-type second mixer circuit including an inner conductor, an intermediate conductor surrounding said inner conductor, an outer conductor surrounding said intermediate conductor, said intermediate conductor being slotted at one end for a distance of approximately one-quarter wavelength at the carrier frequency $f_c$ to form a bifurcated end, a connection from said inner conductor to one side of said bifurcated end of said intermediate conductor, means coupling said signal modulated carrier frequency wave $f_c \pm m$ across said inner and intermediate conductors, a connection from the output of said first mixer to said intermediate conductor of said second mixer, two rectifiers respectively connected to different sides of said bifurcated end of said intermediate conductor of said second mixer; and an output transmission line having an outer conductor electrically connected to said outer conductor of said second mixer and having an inner conductor electrically coupled to derive the rectified product of said second mixer.

4. A mixer circuit for ultra-high and very high frequency waves comprising an inner conductor, an intermediate conductor surrounding said inner conductor, an outer conductor surrounding said intermediate conductor, said intermediate conductor being slotted at one end for a distance of approximately one-quarter wavelength at a carrier frequency $f_o$ to form a bifurcated end, a bifurcated conductive sleeve in capacitive relation to said bifurcated end of said intermediate conductor, a conductive tube in capacitive relation to said inner conductor, a connection from said conductive tube to one side of said bifurcated sleeve at the open end thereof, means adapted to couple a source of carrier frequency energy $f_c$ across said inner and said intermediate conductors, additional means adapted to couple a source of offset frequency energy $f_o$ between said outer conductor and said bifurcated sleeve, two nonlinear devices respectively connected to different sides of said bifurcated sleeve, and an output circuit coupled to said nonlinear devices and said outer conductor to derive a rectified product of said mixer.

5. A mixer circuit for ultra-high and very high frequency waves comprising an inner conductor, an intermediate conductor surrounding said inner conductor, an outer conductor surrounding said intermediate conductor, said intermediate conductor being slotted at one end for a distance of approximately one-quarter wavelength at a carrier frequency $f_c$ to form a bifurcated end, a bifurcated conductive sleeve in capacitive relation to said bifurcated end of said intermediate conductor, a radio frequency connection from said inner conductor to one side of said bifurcated sleeve at the open end thereof, means adapted to couple a source of carrier frequency across said inner and said intermediate conductors, additional means adapted to couple a source of offset frequency between said outer conductor and said bifurcated sleeve, two nonlinear devices respectively connected to different sides of said bifurcated sleeve, and an output circuit coupled to said nonlinear devices and said outer conductor to derive a rectified product of said mixer.

6. A demodulation system for signal modulation $m$ imposed on a carrier frequency wave $f_c$ comprising: a first mixer circuit including an inner conductor, an intermediate conductor surrounding said inner conductor, an outer conductor surrounding said intermediate conductor, said intermediate conductor being slotted for a distance of approximately one-quarter wavelength at the carrier frequency $f_c$ to form a bifurcated end, a bifurcated conductive sleeve in capacitive relation to said bifurcated end of said intermediate conductor, a conductive tube in capacitive relation to said inner conductor, a connection from said conductive tube to one side of said bifurcated sleeve at the open end thereof, means coupling unmodulated carrier frequency energy $f_o$ across said inner and said intermediate conductors, additional means coupling a source of offset frequency energy $f_o$ between said outer conductor and said bifurcated sleeve, two nonlinear devices respectively connected to different sides of said bifurcated sleeve; a second mixer circuit including an inner conductor, an intermediate conductor surrounding said inner conductor, an outer conductor surrounding both said inner conductor and said intermediate conductor, said intermediate conductor being slotted for a distance of approximately one-quarter wavelength at the carrier frequency $f_o$ to form a bifurcated end, a connection from said inner conductor to one side of said bifurcated end of said intermediate conductor, means coupling said signal modulated carrier frequency wave $f_c \pm m$ across said inner and intermediate conductors, a connection from each of said two nonlinear devices of said first mixer to said intermediate conductor of said second mixer, two additional nonlinear devices being respectively connected to different sides of said bifurcated end of said intermediate conductor of said second mixer; and an output circuit coupled to said additional nonlinear devices and said outer conductor to derive a rectified product of said second mixer.

7. A balanced mixer comprising, inner, intermediate, and outer coaxial conductors, said intermediate conductor being slotted at one end to form two parallel conductors, means coupling one end of said inner conductor to the end of one of said two parallel conductors, means to couple a first signal across said inner and said intermediate conductors, means to couple a second signal across said intermediate conductor and said outer conductor, two non-linear devices respectively coupled to the ends of said two parallel conductors, and an output circuit coupled to said non-linear devices to derive a rectified product of said mixer.

8. A balanced mixer comprising, inner, intermediate, and outer coaxial conductors, said intermediate conductor being slotted at one end to form two parallel conductors, means coupling one end of said inner conductor to the end of one of said two parallel conductors, means to couple a first signal across said inner and said intermediate conductors, means to couple a second signal across said intermediate conductor and said outer conductor, two non-linear devices respectively coupled to the ends of said two parallel conductors, and an output circuit coupled to said non-linear devices to derive a rectified product of said mixer, said output circuit including another coaxial line having an inner conductor coupled to both of said non-linear devices, and having an outer conductor connected to said first outer conductor.

9. A balanced mixer comprising, inner, intermediate, and outer coaxial conductors, said intermediate conductor being slotted at one end to form two parallel conductors, means coupling one end of said inner conductor to the end of one of said two parallel conductors, means to couple a first signal across said inner and said intermediate conductors, means to couple a second signal across said intermediate conductor and said outer conductor, two non-linear devices respectively coupled to the ends of said two parallel conductors, and an output circuit coupled to said non-linear devices to derive a rectified product of said mixer, said output circuit including another coaxial line extending at right angles with said three coaxial conductors, and having an inner conductor coupled to both of said non-linear devices, and having an outer conductor connected to said first outer conductor.

10. A balanced mixer comprising, inner, intermediate, and outer coaxial conductors, said intermediate conductor being slotted at one end to form two parallel conductors, means coupling one end of said inner conductor to the end of one of said two parallel conductors, means to couple a first signal across said inner and said intermediate conductors, means to couple a second signal across said intermediate conductor and said outer conductor, two non-linear devices respectively coupled to the ends of said two parallel conductors, and an output circuit coupled to said non-linear devices to derive a rectified product of said mixer, said output circuit including two output conductors coupled respectively to said two non-linear devices, and a hollow conductor constituting an extension of said first outer conductor surrounding said two output conductors.

References Cited in the file of this patent

UNITED STATES PATENTS 2,469,222 Atwood et al. ---------- May 3, 1949

FOREIGN PATENTS 654,523 Great Britain ---------- June 20, 1951

OTHER REFERENCES

Electronics, March 1947, page 209.